United States Patent
Ginesi et al.

(10) Patent No.: US 7,050,825 B2
(45) Date of Patent: May 23, 2006

(54) METHOD FOR POWER REDUCTION IN INTER-SYMBOL INTERFERENCE LIMITED CHANNELS

(75) Inventors: Alberto Ginesi, Noordwijk (NL); Scott McClennon, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 677 days.

(21) Appl. No.: 10/205,577

(22) Filed: Jul. 24, 2002

(65) Prior Publication Data
US 2003/0054852 A1 Mar. 20, 2003

(30) Foreign Application Priority Data
Jul. 24, 2001 (CA) .................................... 2353740

(51) Int. Cl.
*H04B 1/04* (2006.01)
(52) U.S. Cl. ................ 455/522; 455/127.2; 455/115.1; 375/219; 370/252; 370/222
(58) Field of Classification Search ................ 455/522, 455/115.1–4, 126.1–5, 127.1–5; 370/252, 370/208, 203, 210; 375/222, 260, 219
See application file for complete search history.

(56) References Cited

U.S. PATENT DOCUMENTS

| 5,265,151 | A | 11/1993 | Goldstein |
| 5,903,608 | A * | 5/1999 | Chun .......................... 375/260 |
| 6,205,410 | B1 | 3/2001 | Cai |
| 6,226,356 | B1 | 5/2001 | Brown |
| 6,628,704 | B1 * | 9/2003 | Long et al. ................. 375/219 |
| 6,628,754 | B1 * | 9/2003 | Murphy et al. ......... 370/252 X |

* cited by examiner

*Primary Examiner*—Matthew Anderson
*Assistant Examiner*—Philip J. Sobutka
(74) *Attorney, Agent, or Firm*—Merek, Blackmon & Voorhees, LLC

(57) ABSTRACT

Method of reducing transmission power across a loop in a discrete multitone communication system. A first signal to noise ratio (SNR) is estimated for a signal transmitted across the loop. A second SNR is estimated for a signal across the loop, the second SNR signal being estimated exclusive of a predetermined portion of the first SNR. A power cutback scaling factor is determined in accordance with the first SNR, the second SNR, and a predefined maximum SNR degradation amount. The transmission power is scaled in accordance with said scaling factor for reducing said transmission power. In such a manner, fine gains are computed such that the transmit power is reduced without significantly affecting the achieved data rate.

17 Claims, 2 Drawing Sheets

METHOD FOR POWER REDUCTION IN INTER-SYMBOL INTERFERENCE LIMITED CHANNELS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to a method for reducing power required for digital subscriber line (DSL) transmissions, and specifically to a method for reducing power while maintaining a similar signal to noise ratio.

Referring to FIG. 1 a Discrete MultiTone (DMT) communication system is illustrated generally by numeral 100. The system comprises a transmitter 102 and a receiver 150. In the transmitter 102, a set of N Quadrature Amplitude Modification (QAM) symbols $c_l^i$ is used to modulate a set of N tones for every DMT symbol period. The modulation is achieved by feeding the QAM symbols $c_l^i$, l=0, 1, ..., N-1, into an Inverse Fast Fourier Transform (IFFT) 104. The index i indicates the DMT symbol period. The QAM symbol $c_l^i$ carries $b_l$ bits, where $b_l$, l=0, 1, ..., N-1, is referred to as a bit allocation table. Further, the QAM symbol $c_l^i$ is scaled by a fine gain $g_l$, l=0, 1, ..., N-1, before being processed by the IFFT 104. These fine gains are used to change the transmit power in each tone individually. After the IFFT 104, a prefix adder 106 appends a Cyclic Prefix (CP) to the DMT symbol, which is then further conditioned by the transmitter's front end 108 before being transmitted on a line 110. The transmitter's front end includes digital filters 112, a Digital-to-Analog converter (DAC) 114, analog filters 116 and a line driver 118.

At the receiver, the receiver's front end 152 processes the received signal using a analog filters 154, an Analog-to-Digital converter 156 and digital filters 158. A Time Domain Equalizer (TDEQ) 160 partially equalizes the signal at the output of the receiver's front end. A prefix remover 162 remove the Cyclic Prefix and feeds the signal to a Fast Fourier Transform (FFT) 164. At the FFT output, a per-tone single tap Frequency Domain Equalizer (FDEQ) 166 completes the equalization of the signal and a set of slicers 168 retrieves the transmitted QAM symbols $c_l^i$.

As described above the fine gains are determined by the transmitter. For asymmetric digital subscriber line (ADSL) technology, the fine gains are computed at Initialization after a per-bin signal to noise ratio (SNR) estimation phase, referred to as MEDLEY states. The fine gains are computed together with the bit allocation table. They are used to modify per-tone transmit power in order to minimize and equalize the SNR margin across the tones during data transmission, referred to as SHOWTIME. In particular, given a desired number of bits per DMT symbol B and measured channel SNR profiles, the bit and gain allocation tables $b_l$ and $g_l$, l=0, 1, ..., N-1, are jointly computed such that:

$$B = \sum_{l=0}^{N-1} b_l = \sum_{l=0}^{N-1} int\left[\log_2\left(1 + \frac{SNR_l}{\Gamma \cdot m/cg}\right)\right]; \quad (1)$$

$$\log_2\left(1 + \frac{g_l^2 SNR_l}{\Gamma \cdot m/cg}\right) \text{ is an integer between } b_{min} \text{ and } b_{max}; \quad (2)$$

and $$\sum_{l=0}^{N-1} g_l^2 \text{ is minimized.} \quad (3)$$

In the above-equations, $\Gamma$ is a SNR gap for uncoded QAM modulations ($\Gamma$=9.759 dB), m is an imposed system margin, cg is a coding gain for a given coding schemes used by the transmission and $SNR_l$ is the Signal-to-Noise ratio measured on bin l during Initialization. The term, int[x] is defined as the highest integer lower than x, and $b_{min}$ and $b_{max}$ are minimum and maximum number of bits per bin supported.

In ADSL modems, on short loops and with little cross-talk impairment, performance is usually limited by imperfect equalization. Specifically, it is limited by Inter-Symbol Interference (ISI) and Inter-Channel Interference (ICI) terms. These terms are signal level dependent, so that if the power of the transmit signal is reduced, the ICI and ISI terms are reduced by the same amount. Thus, for such loops, if the modem is transmitting at standard power levels, power is being over consumed. Thus, there is a need for a method to reduce the power consumption in these circumstances.

It is an object of the present invention to obviate and mitigate at least some of the above mentioned disadvantages.

BRIEF SUMMARY OF THE INVENTION

In accordance with an aspect of the present invention, there is a provided a method for reducing transmission power across a loop in a discrete multitone communication system. The method comprises the following steps. A first signal to noise ratio (SNR) is estimated for a signal transmitted across the loop. A second SNR is estimated for a signal across the loop, the second SNR signal being estimated exclusive of a predetermined portion of the first SNR. A power cutback scaling factor is determined in accordance with the first SNR, the second SNR, and a predefined maximum SNR degradation amount. The transmission power is scaled in accordance with said scaling factor for reducing said transmission power.

It is an advantage of the present invention that fine gains are computed such that the transmit power is reduced without significantly affecting the achieved data rate.

BRIEF DESCRIPTION OF THE DRAWINGS

Embodiments of the present invention will now be described by way of example only, with reference to the following drawings in which.

DETAILED DESCRIPTION OF PREFERRED EMBODIMENTS

Figure 1:
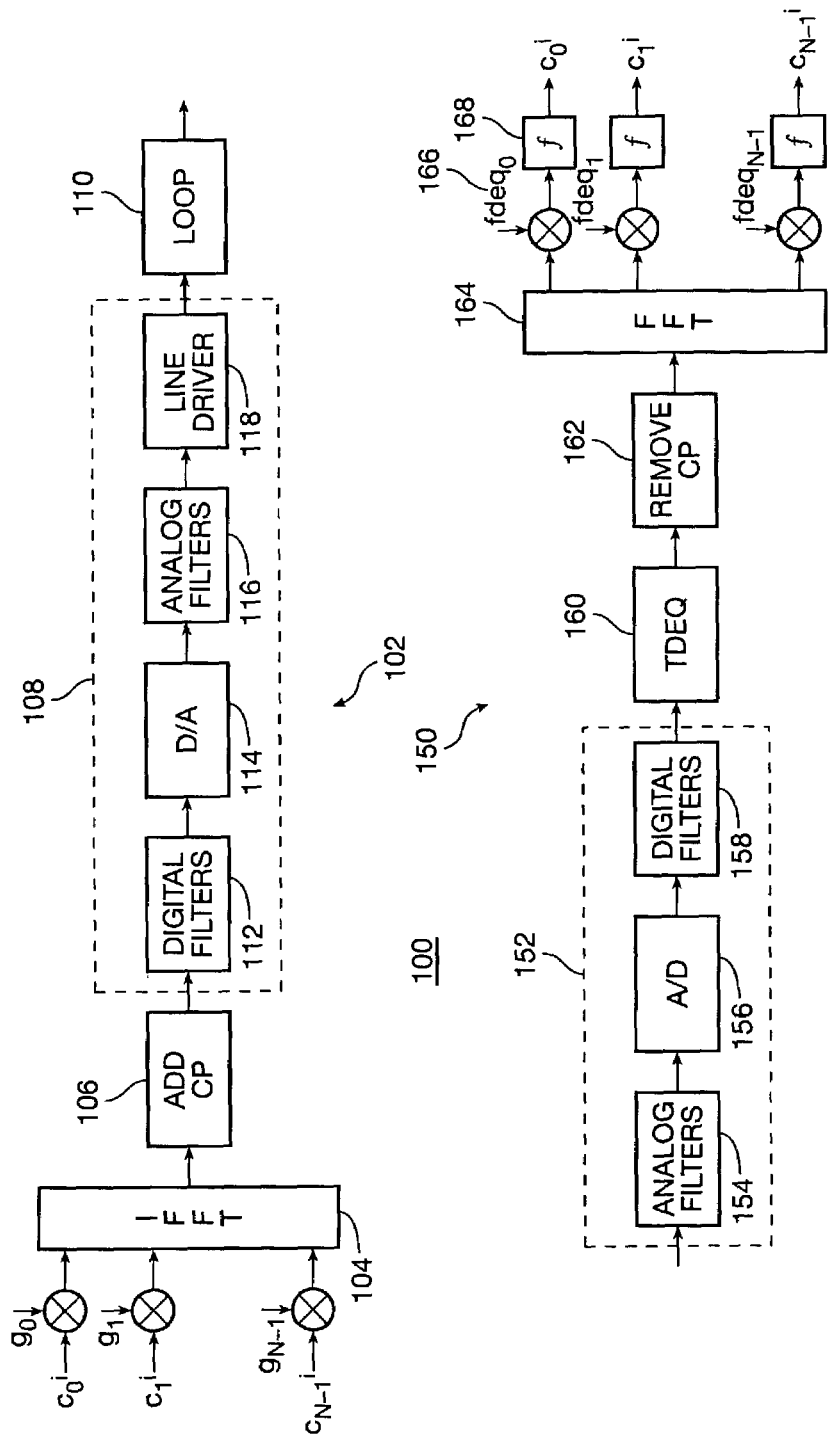
FIG. 1 is block diagram of a Discrete Multitone communication system.

For convenience, like numerals in the description refer to like structures in the drawings. In the following description, algorithms are provided for estimating a maximum amount of power cutback for a given channel that can be applied to a transmit signal without significantly altering the maximum achievable data rate.

For any given channel, the $SNR_l$ at bin l can be written as $$SNR_l = \frac{P_s(l)}{P_n(l) + P_{ISI}(l)} \quad (4)$$

where $P_s(l)$, $P_n(l)$ and $P_{ISI}(l)$ are the power of the signal, noise and ISI at bin l, respectively. In equation 4, the noise power component has been separated into two components; a signal independent noise component $P_n(l)$; and a signal dependent noise component $P_{ISI}(l)$. The independent noise component $P_n(l)$ includes sources of noise that do not vary with the power of the transmit signal, such as line noise (white background noise plus cross-talk noise), and transmitter and receiver noise and echo. The signal dependent noise component $P_{ISI}(l)$ includes ISI and ICI terms from adjacent DMT symbols and carriers. Its value depends on the signal power as long as the tones are uniformly scaled by the same amount.

Since the power of the signal $P_n(l)$ and the power of the ISI $P_{ISI}(l)$ are directly related, it is possible to represent equation 4 including a scaling factor A as:

$$SNR_l(A) = \frac{A^2 P_s(l)}{P_n(l) + A^2 P_{ISI}(l)} \quad (5)$$

By examining equation 5, it can be seen that for channels where $P_n(l)$ is much less than $P_{ISI}(l)$, the SNR is not significantly affected. This is true even for a significant signal power reduction, where $A \ll 1$. In order to clarify this point, two quantities $SNR^0_l$ and $N\_SNR_l$ are defined. $SNR^0_l$ represents the actual signal to noise ratio, and $N\_SNR_l$ represents the estimated noise for a given channel l. These quantities are mathematically defined as:

$$SNR^0_l = \frac{P_s(l)}{P_n(l) + P_{ISI}(l)} \quad (6)$$

$$N\_SNR_l = \frac{P_s(l)}{P_n(l)} \quad (7)$$

In accordance with these definitions, equations 6 and 7 can be substituted into equation 5, resulting in the following equation:

$$SNR_l(A) = \frac{1}{\frac{1}{A^2 \cdot N\_SNR} + \frac{1}{SNR^0_l} - \frac{1}{N\_SNR_l}} \quad (8)$$

Furthermore, equation 8 can be rewritten to express the scaling factor A as a function of SNR, $N\_SNR_l$, and $SNR_l(A)$, yielding the following equation:

$$A^2 = \frac{\frac{SNR^0_l}{N\_SNR_l}}{\frac{SNR^0_l}{SNR_l(A)} - 1 + \frac{SNR^0_l}{N\_SNR_l}} \quad (9)$$

Figure 2:
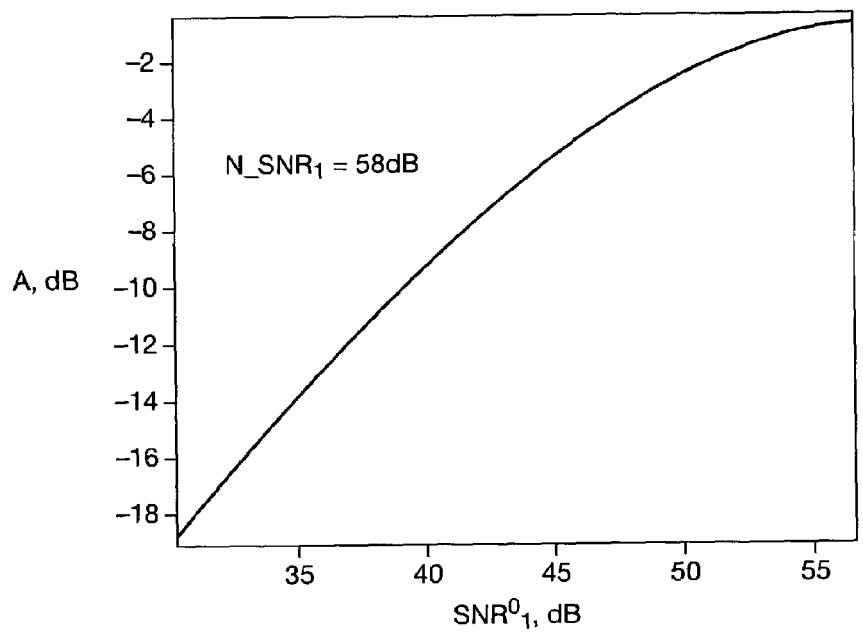
FIG. 2 is graph illustrating a potential power reduction curve.

In equation 9, the ratio $$\frac{SNR^0_l}{SNR_l(A)}$$

is referred to as SNR degradation and is expressed in dB. Referring to FIG. 2, a sample for the function A is illustrated. In the present example, A is represented as function of $SNR^0_l$ for $N\_SNR_l=58$ dB and an SNR degradation of 0.5 dB. Thus, if, for example, $SNR^0_l=40$ dB, up to approximately 9 dB of power cut back can be applied to the transmit signal without affecting the bin SNR by more than 0.5 dB.

Therefore, if $N\_SNR_l$, l=0, 1, . . . , N-1 is measured, then one could estimate the power cutback that can be applied to a transmission, while limiting the SNR degradation $SNR^0_l/SNR_l(A)$ to less than a predefined number. The following description illustrates several methods for estimating $N\_SNR_l$ during initialization of G.992.1, G.992.2, G.dmt-bis and G.lite-bis standard modems.

Figure 3:
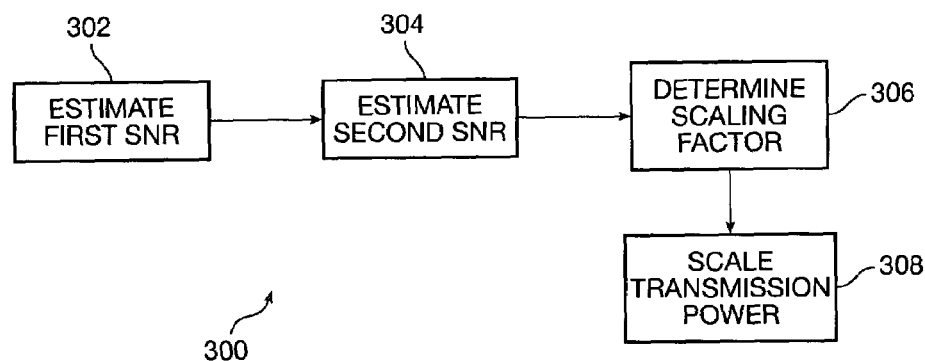
FIG. 3 is a flowchart of a method according to an embodiment of the present invention.

FIG. 3 is a flowchart illustrating the main steps in a method 300 according to an embodiment of the present invention. In step 302, a first SNR is estimated. In step 304, a second SNR is estimated. The second SNR is estimated exclusive of a predetermined portion of the first SNR. In step 306, a power cutback scaling factor is determined. The power cutback scaling factor depends upon the first SNR, the second SNR, and a predefined maximum SNR degradation amount. In step 308, the transmission power is scaled in accordance with the power cutback scaling factor. These steps are further described below with specific reference to DSL systems.

For clarity, an ADSL modem located at a central office is referred to as an ATU-C and an ADSL modem located at a remote terminal is referred to as an ATU-R. Generally, the standards indicate a signal from the ATU-R by appending a prefix "R" before the signal name. Similarly, they indicate a signal from the ATU-C by appending a prefix "C" before the signal name.

In a first embodiment, $N\_SNR_l$ is estimated during a full duplex R/C-REVERB state, before C/R-MEDLEY, when the SNR is typically estimated, and after the time and frequency domain equalizers have been trained and applied in the receiver.

For the G.992.1 and G.992.2 standard modems, this corresponds to the R-REVERB2/C-REVERB3 state. In this state, a periodic multi-tone signal is transmitted across the loop. Since the signal is periodic, no ISI or ICI term is observed. All the other sources of noise are present in this state, including line noise, transmit and receive, and echo. Therefore, if the per bin SNR is estimated at the receiver slicer during this state, it corresponds to $N\_SNR_l$, l=0, 1, . . . , N-1.

Since the SNR is determined during MEDLEY, it is preferable to ensure that the echo contribution is the same during REVERB as it is during MEDLEY. In order to achieve this, the REVERB tones in the frequency band of the echo are frequency shaped such that the Power Spectral Density (PSD) of the transmit signal during REVERB resembles the PSD of the transmit signal during MEDLEY. That is, if PSD_M(f) is the MEDLEY PSD, the tones during REVERB are scaled in power such that the power of a tone at bin 1 is $\Delta f \ast PSD\_M(l\Delta f)$, where $\Delta f$ is the bin, or sub-carrier, spacing. Note also, that the FDEQ should be present in order to equalize the received signal. The TDEQ is not required for signal equalization. However, its presence guarantees that the noise, particularly the out of band noise, is shaped in frequency as it is during MEDLEY.

A similar state to that described above is present in G.dmt-bis and G.lite-bis standard modems just before a Channel Analysis phase of the initialization procedure. Thus, the same algorithm can be applied.

In an alternate embodiment, the signal power is estimated during an early C/R-REVERB state and the noise power is estimated during C-ECT/R-ECT states. For G.992.1 and G.992.2 standard modems these states corresponds to C-REVERB2 and R-ECT for noise estimation at the ATU-R and R-REVERB1 and C-ECT for noise estimation at the ATU-C.

During C-REVERB2/R-REVERB1 the modem estimates the per-bin channel frequency response $H_l$, l=0, 1, . . . , N-1. Then, during R-ECT/C-ECT the per-bin noise power $P_n(l)$, l=0, 1, . . . , N-1 is estimated. During these states the transmitter sends the same signal that it sends later during the C-MEDLEY/R-MEDLEY states. This is possible since the standards allows a vendor to send discretionary signals during C-ECT/R-ECT. $N\_SNR_l$ is computed as the ratio $P_T \ast abs(H_l)^2/P_n(l)$, l=0, 1, . . . , N-1, where $P_T$ is known power of the transmit QPSK symbols at the IFFT input.

This method can lead to a less accurate estimate of $N\_SNR_l$ for two reasons. First, the TDEQ is not present during the line noise estimation at this state, so the out of band noise suppression that it usually provides is not part of this estimate. Second, sidelobes of the MEDLEY-like signal during C-ECT/R-ECT are slightly lower than those during C-MEDLEY/R-MEDLEY as no cyclic prefix can be used during C-ECT/R-ECT. The greater inaccuracy for this type estimate has to be taken into account when computing an optimum fine gain table, which will be described in detail at a later point in the description.

For G.dmt-bis and G.lite-bis standard modems, similar states are present during the Transceiver Training phase of the initialization procedure. Thus, the same algorithm can be applied.

In yet an alternate embodiment, $N\_SNR_l$ is estimated during C-COMB/R-COMB states for G.dmt-bis and G.lite-bis standards modems. In G.dmt-bis and G.lite-bis standard initialization sequence, states are defined during the first part of the sequence, which is referred to as "Channel Discovery". These states are called C-COMBx/R-COMBx, where x=1, 2, . . . , since several states are used where the same signal is sent across the loop. During these states, a COMB of tones is sent across the loop. Specifically, tones that are sent have indexes START_index+m*SPACING, m=0, 1, . . . M-1, where START_index is a lowest index tone, SPACING is a number of indices between transmitted tones, and M is an integer such that START_index+(M-1)*SPACING is less than N.

The transmitted tones are continuous tones. That is, they are not modulated from one DMT symbol to the next. Therefore, if the SNR on these tones is estimated it would correspond to $N\_SNR_l$, where l is the index of the given tone. Since not all tones are present during the C-COMB/R-COMB states, interpolation between adjacent N_SNR measurements is performed to estimate $N\_SNR_l$, for l=0, 1, . . . , N-1.

The present technique provides an advantage in that it the estimate for $N\_SNR_l$ is obtained very early during Initialization. In fact, the estimate is obtained even before power cutbacks are applied during the Initialization sequence, which occurs at the beginning of Transceiver Training. If a target data rate is available as well as an estimate of the $SNR^0{}_l$ vector, based, for example, on past activations, one could apply the Transceiver training cutbacks based on the quantity A of equation 9. Such an early cutback has the advantage of reducing signal power even during Initialization, thus further reducing power consumption and interference into loops sharing the same binder.

Once $N\_SNR_l$, l=0, 1, . . . , N-1 has been determined, preferably using one of the above described methods, a fine gain table is computed as follows. $SNR^0{}_l$, l=0, 1, . . . , N-1, is estimated during R-MEDLEY or C-MEDLEY. As in the prior art, a set of fine gains $g_l$, l=0, 1, . . . , N-1, is calculated in order to satisfy equations 1 to 3. A quantity $\Delta SNR$ represents a ratio of the SNR exclusive of ISI noise to the SNR inclusive of ISI noise and is defined in accordance with the following equation:

$$\Delta SNR = \min_l [N\_SNR_l / SNR^0_l] \qquad (10)$$

Therefore, if the ISI noise comprises a major component of the noise, the value of $\Delta SNR$ will increase. Conversely, if other sources of noise comprise a major component of the noise, the value of $\Delta SNR$ will decrease.

Further, the maximum amount of SNR degradation that can be tolerated as a result of a power cutback $SNR_{deg}$ is defined in accordance with the following equation:

$$SNR_{deg} = \frac{SNR^0_l}{SNR_l(A)} \qquad (11)$$

Substituting equations 10 and 11 into equation 9, yields the follow equation for determining the gain factor A:

$$A = \sqrt{\frac{1/\Delta SNR}{SNR_{deg} - 1 + 1/\Delta SNR}} \qquad (12)$$

The fine gain table as computed in accordance with equations 1 to 3, are modified to provide a final fine gain table in accordance with the following equation:

$$g\_final_l = \begin{cases} g_l, & \text{if } 10\log_{10}(\Delta SNR) < x \text{ dB} \\ A \ast g_l, & \text{otherwise} \end{cases} \qquad (13)$$

In equation 13, x (dB) is preferably the sum of the estimated maximum errors with which $N\_SNR_l$ and $SNR^0{}_l$ were estimated. As previously described, if the noise due to ISI is a major component, the value of $\Delta SNR$ increases.

Therefore, if the ISI is sufficiently significant such that $10 \log_{10}(\Delta SNR) < x$ dB, the gain can be reduced by the gain factor A, thus reducing the required transmit power, as desired.

The preceding embodiments employ $\Delta SNR$ as the constraint on the minimization of the transmit power. Although this leads to a simple and direct formula for the calculation of the scale factor, A, it can be defeated in cases where there are significant narrowband additive noise sources that result in high values for the per-bin noise power $P_n(l)$ on just a few bins. In an alternate embodiment, the constraint is the channel capacity estimate itself. Recall equation 1

$$B = \sum_{l=0}^{N-1} b_l = \sum_{l=0}^{N-1} int\left[\log_2\left(1 + \frac{SNR_l}{\Gamma \cdot m/cg}\right)\right]; \quad (1)$$

If $SNR_l$ is replaced by as estimated per-bin SNR given a gain scale factor A $SNR_l(A)$, as defined in equation 8, then a capacity estimate as a function of A may be computed as follows:

$$B(A) = \sum_{l=0}^{N-1} b_l = \sum_{l=0}^{N-1} int\left[\log_2\left(1 + \frac{SNR_l(A)}{\Gamma \cdot m/cg}\right)\right]; \quad (14)$$

In equation 14, a conservative, rate-independent value is assumed for coding gain (cg). If the constraint on minimization of the transmit power is then given as a maximum permissible drop in capacity $\Delta B$, then B(A) can be calculated over a range of values of A. The smallest value of A, denoted $A_{min}$, for which $B(A_{min}) \geq B(1.0) - \Delta B$, is then taken as the permissible transmit signal scaling factor. This method requires an iterative and more computationally intensive calculation to determine A than that described in the previous embodiments. For this reason, it may be preferred to employ this method only in those cases where there is evidence of narrowband noise peaks on a number of bins that is much less than the total number of bins N. This can be determined by examining the PSD of the signal as will be appreciated by a person skilled in the art.

Although the invention has been described with reference to certain specific embodiments, various modifications thereof will be apparent to those skilled in the art without departing from the spirit and scope of the invention as outlined in the claims appended hereto.

What is claimed is:

1. A method for reducing transmission power across a loop in a discrete multitone communication system comprising the steps of:
   a) estimating a first signal to noise ratio (SNR) for a signal transmitted across said loop;
   b) estimating a second SNR for a signal across said loop, said second SNR signal being estimated exclusive of a predetermined portion of said first SNR;
   c) determining a power cutback scaling factor in accordance with said first SNR, said second SNR, and a predefined maximum SNR degradation amount; and
   d) scaling said transmission power in accordance with said power cutback scaling factor for reducing said transmission power.

2. A method as defined in claim 1, wherein said predetermined portion of said first SNR includes intersymbol interference and interchannel interference.

3. A method as defined in claim 2, wherein said first SNR is estimated during a MEDLEY state and said second SNR is estimated during a REVERB state.

4. A method as defined in claim 3, wherein a signal frequency of said REVERB state is shaped such that a power spectral density of said signal frequency resembles a power spectral density of a signal frequency of said MEDLEY state.

5. A method as defined in claim 2, wherein said second SNR is estimated prior to a channel analysis phase of an initialization procedure.

6. A method as defined in claim 2, wherein said second SNR is calculated in accordance with an estimated frequency response of said signal and an estimated noise power.

7. A method as defined in claim 6, wherein said estimated frequency response of a signal and said estimated noise power are estimated at a per bin level.

8. A method as defined in claim 7, wherein said estimated frequency response is estimated during a REVERB state.

9. A method as defined in claim 7, wherein said estimated frequency noise power is estimated during an ECT state.

10. A method as defined in claim 7, wherein said estimated frequency response is estimated during a transceiver training phase of an initialization procedure.

11. A method as defined in claim 2, wherein said second SNR is estimated by estimating a SNR on a plurality of continuous tones sent across said loop, said continuous tones not being modulated between discrete multitone signals.

12. A method as defined in claim 11, wherein said plurality of continuous tones represents a portion of possible tones and said SNR for remaining tones are interpolated.

13. A method as defined in claim 2, wherein said scaling factor is determined in accordance with the equation $$A = \sqrt{\frac{1/\Delta SNR}{SNR_{deg} - 1 + 1/\Delta SNR}},$$

where $SNR_{deg}$ is said predefined maximum SNR degradation amount and $\Delta SNR$ is a ratio of said second SNR and said first SNR.

14. A method as defined in claim 2, wherein said transmission power is scaled only when a difference between said first SNR and said second SNR is less than a predefined threshold.

15. A method as defined in claim 14, wherein said predefined threshold is a sum of errors accumulated in estimating said first SNR and said second SNR.

16. A method for reducing transmission power across a loop in a discrete multitone communication system comprising the steps of:
   a) estimating a channel capacity in accordance with a full power signal;
   b) estimating a plurality of scaled channel capacities in accordance with corresponding ones of a plurality of scaled power signals, said scaled power signals being scaled in accordance with a scaling factor;
   c) selecting a power cutback scaling factor in accordance with a lowest one of said scaling factors that results in an estimated scaled channel capacity that differs less than a predefined amount from said estimated channel capacity; and d) scaling said transmission power in accordance with said selected power cutback scaling factor for reducing said transmission power.

17. A method as defined in claim 16, wherein said method is only used when narrowband noise is detected in said communication system.

* * * * *